(12) United States Patent
Zhang

(10) Patent No.: US 12,025,121 B2
(45) Date of Patent: Jul. 2, 2024

(54) LUBRICANT STRUCTURE AND LUBRICANT METHOD FOR BELT PUMPING UNIT

(71) Applicant: Deuri Petroleum Equipment (Qingdao) Co., Ltd., Qingdao (CN)

(72) Inventor: Cong Zhang, Qingdao (CN)

(73) Assignee: Deurui Petroleum Equipment (Qingdao) Co., Ltd., Qingdao (CN)

( * ) Notice: Subject to any disclaimer, the term of this patent is extended or adjusted under 35 U.S.C. 154(b) by 136 days.

(21) Appl. No.: 17/728,622

(22) Filed: Apr. 25, 2022

(65) Prior Publication Data

US 2022/0341418 A1    Oct. 27, 2022

(51) Int. Cl.
| | |
|---|---|
| *F04B 53/18* | (2006.01) |
| *F04B 9/02* | (2006.01) |
| *F04B 47/02* | (2006.01) |
| *E21B 43/12* | (2006.01) |
| *F16H 57/04* | (2010.01) |

(52) U.S. Cl.
CPC .............. *F04B 53/18* (2013.01); *F04B 9/02* (2013.01); *F04B 47/02* (2013.01); *E21B 43/126* (2013.01); *F16H 57/0456* (2013.01); *F16H 57/0458* (2013.01)

(58) Field of Classification Search
CPC .. F04B 53/18; F04B 9/02; F04B 47/02; E21B 43/126; F16H 57/0456; F16H 57/0458
See application file for complete search history.

(56) References Cited

U.S. PATENT DOCUMENTS

| | | | | |
|---|---|---|---|---|
| 2,351,183 A * | 6/1944 | Blackburn | .............. | F04B 47/02 74/37 |
| 2,977,808 A * | 4/1961 | Dobbs | ..................... | F04B 47/02 74/37 |
| 4,519,262 A * | 5/1985 | Le | ........................... | F04B 47/02 192/223.1 |
| 4,916,959 A * | 4/1990 | Lively | ..................... | F04B 47/02 74/89.21 |
| 5,027,666 A * | 7/1991 | Filicetti | ................... | F16H 19/06 74/89.2 |
| 5,309,992 A * | 5/1994 | Watson | .................... | F04B 47/02 74/61 |
| 7,530,799 B2 * | 5/2009 | Smith | ...................... | F04B 47/04 417/904 |
| 10,196,883 B2 * | 2/2019 | Robison | .................. | F04B 47/14 |

* cited by examiner

*Primary Examiner* — Charles G Freay
(74) *Attorney, Agent, or Firm* — Kenneth H. Jack; Davis & Jack L.L.C.

(57) ABSTRACT

An assembly for dispersing a lubricant upon a long stroke oil well rig's chain coupling roller trolley, the assembly incorporating a track frame receiving the roller trolley for leftward and rightward rolling motions; at least a first dip bucket fixedly attached to a lower end of the track frame; a front nozzle connected operatively to the at least first dip bucket for rearwardly emitting portions of the lubricant; an underlying lubricant well adapted for receiving and filling the at least first dip bucket; a rear conduit positioned for collecting the rearwardly emitted portions of the lubricant; a collection pocket underlying the rear conduit; a rear nozzle connected operatively to the collection pocket for forwardly emitting the portions of the lubricant toward the roller trolley.

17 Claims, 5 Drawing Sheets

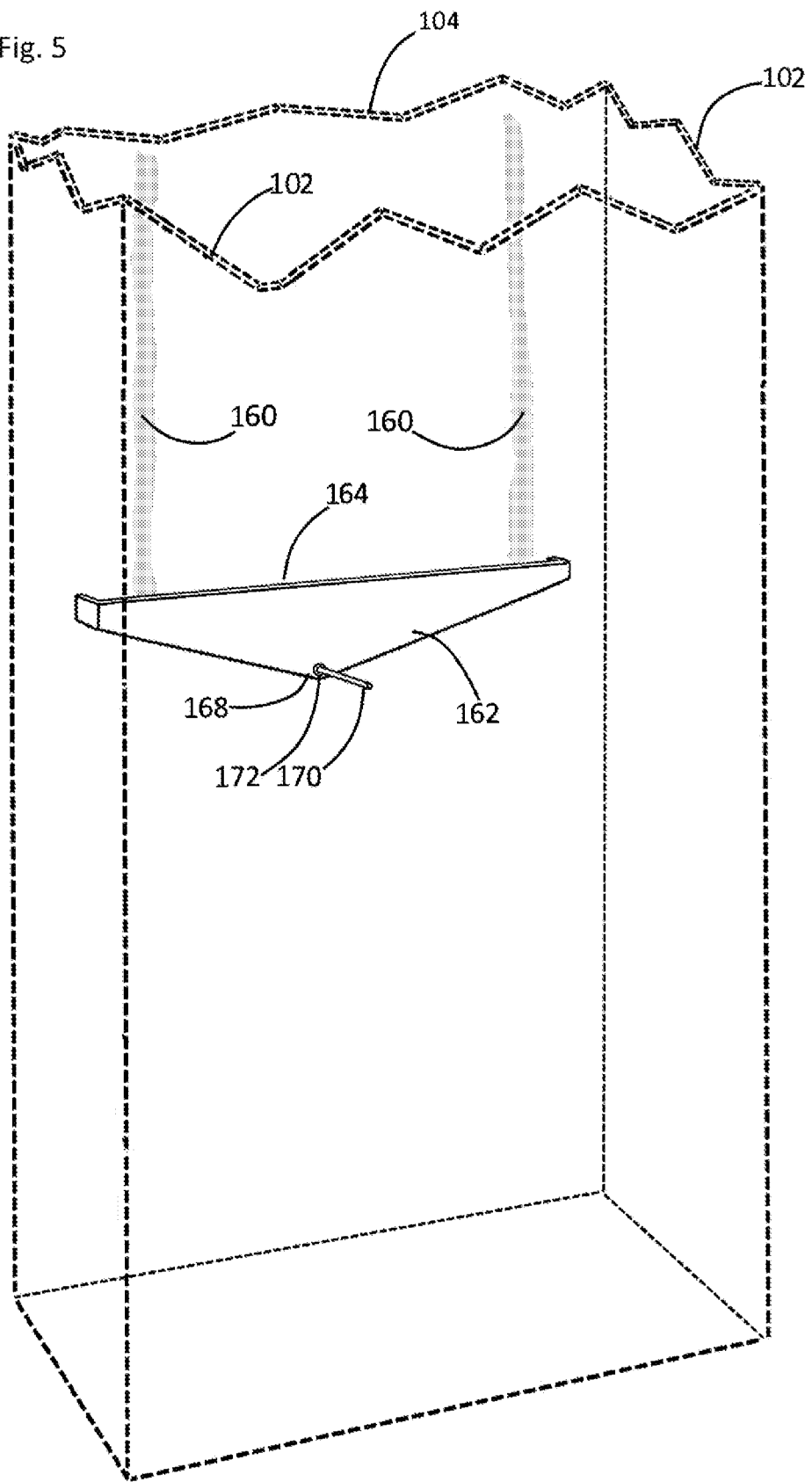

LUBRICANT STRUCTURE AND LUBRICANT METHOD FOR BELT PUMPING UNIT

CLAIM OF BENEFIT OF PREVIOUSLY FILED INTERNATIONAL PATENT APPLICATIONS

The Applicant herein claims the benefit of International Patent Application No. PCT/CN2021/091255, entitled "A Lubrication Structure and Lubrication Method of a Belt Pumping Unit" filed in the CNIPA PCT world filing office on Apr. 30, 2021. The Applicant further claims the benefit of China National Application No. 202110453327.4 having the same title, and filed in the CNIPA on Apr. 26, 2021. Said '327.4 CNIPA application constitutes the priority filing claimed in said '255 international PCT application. The Applicant of the instant application and that of said '327.4 and '255 applications are one and the same entity, and the inventor of the instant application is named as an inventor in each of said '327.4 and '255 applications.

FIELD OF THE INVENTION

The invention relates to the technical field of oil field pumping units or rigs of the type described in U.S. Pat. No. 4,916,959 issued Apr. 17, 1990, to Lively. More particularly, this invention relates to systems and assemblies mounted within such units which are adapted for lubricating internal moving parts.

BACKGROUND

As an important source of energy, oil exploration has had a significant impact on the development and progress of industry. Above ground oil field pumping rigs include walking beam pumping unit types and vertical tower pumping unit types. The vertical tower type of pumping unit rig often incorporates a flexible belt and pulley combination for coordinating the raising and lowering motion of a counterweight with the raising and lowering motion of the wellhead sucker rod. Such counterweight and belt adapted rigs are mainly utilized upon deep oil wells whose working conditions require a long stroke.

Belt pumping units of the type described above incorporate a motor driven lower drive sprocket in combination with an overlying idler sprocket. A continuous loop chain extending about said sprockets carries a balance weight or counterweight upwardly and downwardly within a derrick case or frame body, the counterweight being guided by pulleys or rollers. One end of a flexible belt connects with the balance weight, and the other end of the belt connects with the oil well's sucker rod or polished rod. As the belt reciprocatingly moves over an upper drum or roller, the sucker rod moves up and down to pump oil. Due to friction, moving parts of the assembly need to be lubricated in order to prolong the life of the mechanism.

A reversing block, steering block or roller trolley provides a connection between the continuous loop chain and the balance weight, and such components need lubrication. Known and existing lubrication systems often fail to adequately lubricate the reversing block, leading to serious wear and requiring frequent replacement of the reversing block or its moving parts.

An example of such long stroke oil well pumping units or rigs is described in U.S. Pat. No. 4,916,959. Such rigs provide a lubrication reservoir at the bottom of the rig which facilitates oil immersion of both the lower flight of the continuous loop chain and the roller trolley. In order to minimize the depth of the reservoir, dip buckets are known to be installed at the lower end of the roller trolley's frame. Such dip buckets collect oil from the reservoir and carrying the oil upwardly without requiring oil immersion of other structures. Outlet nozzles extending laterally from the dip buckets toward the chain are able to disperse portions of the collected oil over the chain as the trolley and dip buckets travel upwardly. Such oil dispersion over the chain is enabled by the vertical movement of the trolley and dip buckets with respect to the continuous loop chain and sprockets assembly. The relative movement of the dip buckets along such assembly allows oil from the dip buckets to be dispersed over the assembly.

In contrast, the relatively fixed and overlying position of the pumping unit's roller trolley with respect to the underlying dip buckets tends to interfere with dispersion of oil from the dip buckets onto the roller trolley. The oil naturally flows downwardly, preventing dispersal onto overlying structures such as the roller trolley.

The instant inventive assembly for dispersing a lubricant upon a long stroke oil well rig's chain coupling roller trolley solves or ameliorates such problems, deficiencies and challenges by specially configuring a long stroke oil well pumping rig to utilize wall surfaces within the tower's casing as oil collecting and conveying conduits and to provide a specially configured and positioned oil collecting dip bucket and pocket vessels having nozzles which are capable of dispersing oil from such underlying dip buckets to such overlying roller trolley.

SUMMARY OF THE INVENTION

A purpose of the invention is to provide lubrication components and assemblies within a belt pumping unit and a method of use of such components, the assembly and method ameliorating the technical lubrication problems described above.

The invention provides a lubrication assembly for a belt pumping unit or long stroke vertical column oil rig which comprises a frame or casing, an upper drum or roller, and a belt which reciprocatingly travels over the upper drum. Ends of the belt are connected to a wellhead's sucker rod or polished rod and to a balance weight or counter weight within the rig's column. The balance weight moves freely upwardly and downwardly in the frame or casing, such motion being guided by a plurality of rollers. The balance weight is connected to a continuous loop chain at a reversing block or roller trolley, and the instant invention's components which are adapted for lubricating the reversing block are operatively mounted between the balance weight or components attached thereto and the case's rear wall. In operation, the lubrication assembly repeatedly performs steps of oil collecting and oil spraying in response to the reciprocating up and down movements of the balance weight.

The lubrication assembly includes front vessels in the form of an oil box or dip buckets which are fixedly installed below the balance weight, such box or buckets being provided with oil spraying nozzle outlets for initially spraying lubricating oil onto the rear wall of the frame or casing.

The lubricating oil which is sprayed by the assembly onto the rear wall of the case flows freely downwardly along such wall due to the action of gravity. Such oil is collected within another vessel in the form of a collecting box or pocket which may be mounted upon the forward surface of the rear wall. An oil guide pipe or nozzle for forwardly respraying lubricating oil is mounted upon the oil collecting box or pocket. The steering block or roller trolley is advantageously lubricated by the resprayed oil as it moves upwardly and downwardly across the vertical position of the oil collecting box.

Spray angle adjusting assemblies may be installed at the output ends of the spray nozzles in order to direct the emitted oil along arcing trajectories which lengthen the horizontal travel of the sprayed oil. Such nozzle spray angle adjustment assemblies may include a bottom plate, upon which a through hole for installing an adjustment slide rod is provided. An opposite end of the adjustment slide rod may be movably connected to an oil outlet conduit at the nozzle's output end. A position limiting member may be mounted at a connection between the adjustment slide rod and the through hole, the through hole suitably being configured as an oblong aperture.

In order to enhance static fluid pressure at the collecting pocket's nozzle output, the lower output end of the oil collection pocket may be configured as a vertically extending and relatively narrow diameter stand pipe.

In assembly and operation of the instant invention, an oil box or dip buckets are installed at a vertical position underlying the balance weight so that the buckets move up and down with the balance weight. When the balance weight moves to the bottom of the frame or case, the attached buckets are immersed within lubricating oil stored within a lower well or reservoir at the bottom of the case. Upon raising of the balance weight and the dip buckets, lubricating oil collected within the dip buckets is sprayed from the dip buckets onto the case's rear wall via such buckets' nozzle outlets. The lubricating oil then flows down along the inner or forward surface of the rear wall of the frame or case under the action of gravity. Such oil is temporarily gathered within the oil collecting box or pocket which is mounted upon the rear wall. Oil collected within the pocket is ejected or resprayed forwardly from the pocket's nozzle outlet. In the above described assembly, the case's rear wall is utilized as a oil collecting and conveying conduit. A separate oil collecting and conveying conduit may be alternatively installed forwardly from the rear wall. Upon reciprocating vertical movements of the roller trolley across the vertical position of the oil collecting box or pocket, the forwardly sprayed lubricating oil is applied directly onto the steering block and onto its moving parts to achieve lubrication of those components.

As a result of the continuous up and down movements of the balance weight and the dip buckets, the lubrication oil is continuously and repeatedly collected in the dip buckets. Such oil is continuously and repeatedly ejected or sprayed onto the rear wall of the case to downwardly flow into the oil collecting box or pocket. The oil is advantageously continuously resprayed forwardly to repeatedly lubricate the roller trolley as it vertically traverses the forward path of the resprayed oil. Accordingly, the inventive assembly overcomes mechanical wear caused by the lack of sufficient lubrication of the roller trolley.

A structural component which is lubricated by the instant inventive assembly may comprise a track frame which receives and guides the roller trolley. In the suitable embodiment, the track frame facilitates leftward and rightward rolling motions of the trolley upon tracks rigidly supported within the frame. The structure of the inventive assembly with initially collect the oil may comprise at least a first dip bucket, and preferably a pair of or left and right dip buckets. In such embodiment, the dip buckets are fixedly attached to and have rearward ends which extend rearwardly from a lower end of the track frame.

A further structural component of the instant inventive assembly may comprise a front port which is configured as a nozzle, such nozzle being connected operatively to the at least first dip bucket. Where left and right dip buckets are provided, left and right front nozzles are preferably correspondingly provided. In such embodiment, the nozzles are attached and directed to rearwardly disperse portions of lubricant which are collected and carried upwardly within the interiors of the dip buckets.

A further structural component of the instant inventive assembly may comprise an underlying lubricant well or reservoir which is situated and mounted at the base or lower end of the oil well rig's vertical tower or derrick. In such embodiment, the lower reservoir is sized and positioned to downwardly receive the dip buckets, immersing them within the stored oil.

A further structural component of the instant inventive assembly comprises a rear conduit which is positioned for collecting the portions of the lubricant which are rearwardly dispersed from the dip buckets' front nozzles. In a suitable embodiment, the rear conduit comprises a forwardly facing surface of a rear wall of the derrick's casing. Suitably, other conduit structures may be installed forwardly from the casing's rear wall. Upon contact of the rearwardly dispersed oil with such conduit, the oil collects thereon by fluid adhesion and flows downwardly therealong.

A further structural component of the instant inventive assembly may comprise an upwardly opening oil collection pocket which is suitably mounted upon the rear casing wall. In such embodiment, the collection pocket may be laterally widened, allowing it to collect left and right oil flows which are supplied by the dip buckets' left and right nozzles. The collection pocket is preferably mounted within the flow paths of the above described downward flows of oil. The collection pocket may advantageously include a "V" shaped floor for centrally collecting oil flowing into such pocket, and a pressure enhancing stand pipe output tube may be installed at the vertex of such "V" shaped floor.

A further structural component of the instant inventive assembly may comprise a rear nozzle configured port which is connected operatively to the output of the collection pocket. In a suitable embodiment, the rear nozzle is oriented and adapted for forwardly dispersing or spraying the portions of the oil lubricant which are collected within the collection pocket.

A further structural component of the instant inventive assembly may comprise a front conduit which overlies the track frame and overlies the roller trolley which laterally reciprocatingly rolls within such frame. In a preferred embodiment, such front conduit may comprise a rearwardly facing surface of the pumping unit's counterweight which typically directly overlies the unit's track frame.

In operation of the above described embodiment of the instant inventive assembly, the counterweight along with its attached and underlying track frame, roller trolley, and dip bucket components may initially move upwardly from a lowermost point at which the dip buckets are submerged within the oil lubricant within the rig's lower reservoir. Upon emerging from such well, the dip buckets immediately commence dispersing portions of the collected oil rearwardly, such oil emitting from the dip bucket's rearwardly extending forward nozzles.

Oil emitted from the dip bucket's forward nozzles traverses the air space between the rearward distal ends of such nozzles and the forwardly facing surface of the derrick case's rear wall. Such oil, upon contacting the case's wall, adheres to the wall and immediately flows downwardly therealong. The collection pocket, which is preferably mounted upon the rear wall at a point of intersection with such flow path, collects portions of such rearwardly dispersed oil. Upon filling of the collection pocket with oil, the oil is re-dispersed forwardly by the pocket's forwardly extending rear nozzle. Such re-dispersed oil is forwardly sprayed, traversing the air space between the forward distal end of such nozzle and the roller trolley and the rearwardly facing surface of the counterweight. Portions of such forwardly re-dispersed oil which fall upon the roller trolley directly lubricate the roller trolley.

Similarly with the downward flow of oil along the case's rearward wall, the portions of the forwardly re-dispersed oil which are dispersed over the rearward face of the counterweight flow downwardly therealong. Upon downward flow of such oil to the lower end of the counterweight, the oil is able to further downwardly flow over the immediately underlying roller trolley, beneficially further lubricating such trolley's moving parts.

In a suitable embodiment, a collection tray having an apertured floor is situated at the lower end of the counterweight for temporary collection of such forwardly re-dispersed and downwardly flowing oil portions, such tray having a series of oil passage apertures for conveying the collected oil to the immediately underlying roller trolley.

ILLUSTRATION WITH DRAWINGS

In order to illustrate an embodiment of the invention, drawings of structures that may be incorporated in the inventive assembly are introduced below.

FIG. 5 is an opposite perspective view of the derrick tower casing component of FIG. 4, the view showing a wall mounted oil collection pocket component.

Figure 1:
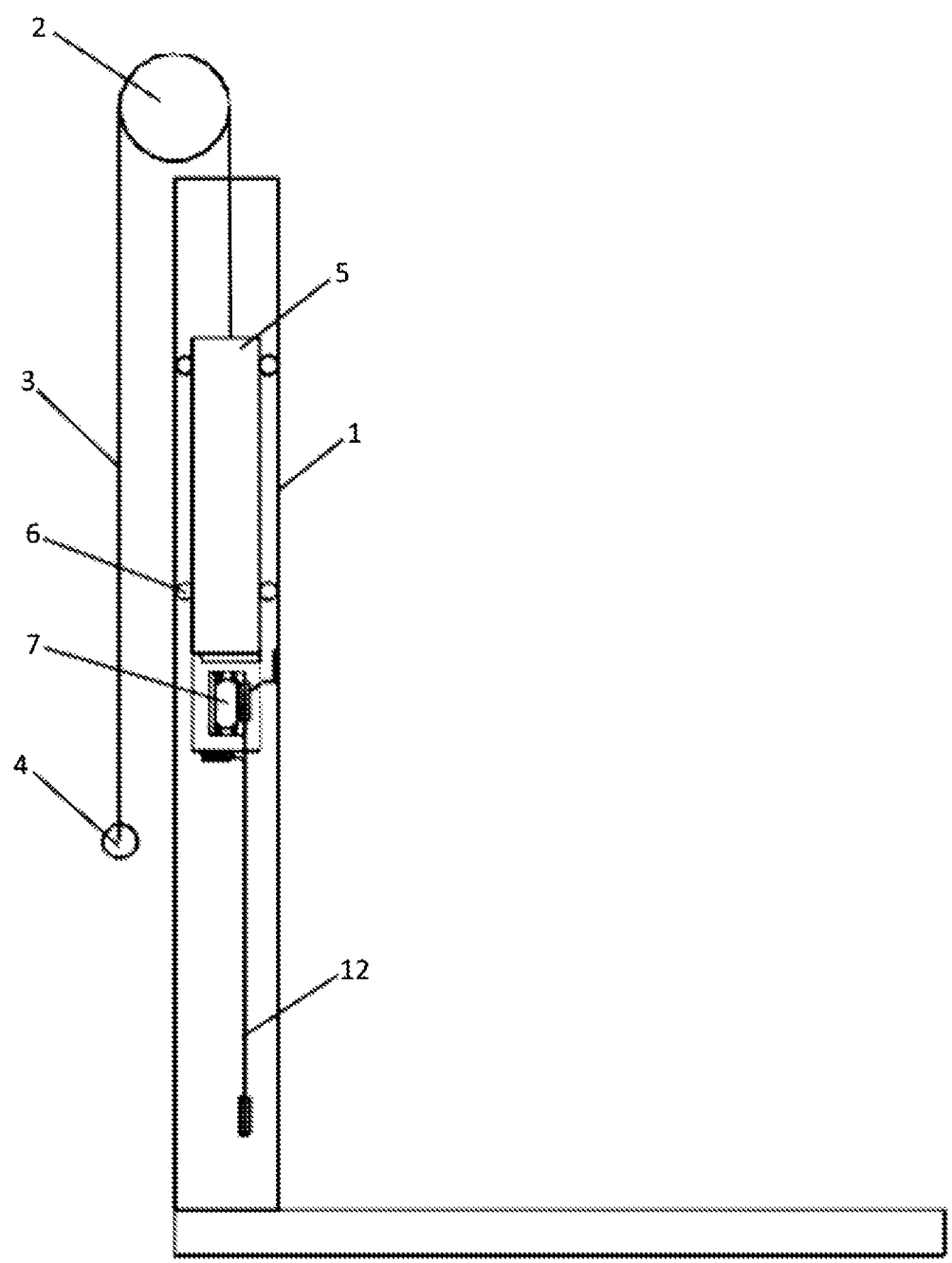
FIG. 1 is schematic diagram of an embodiment of the instant invention.
Figure 2:
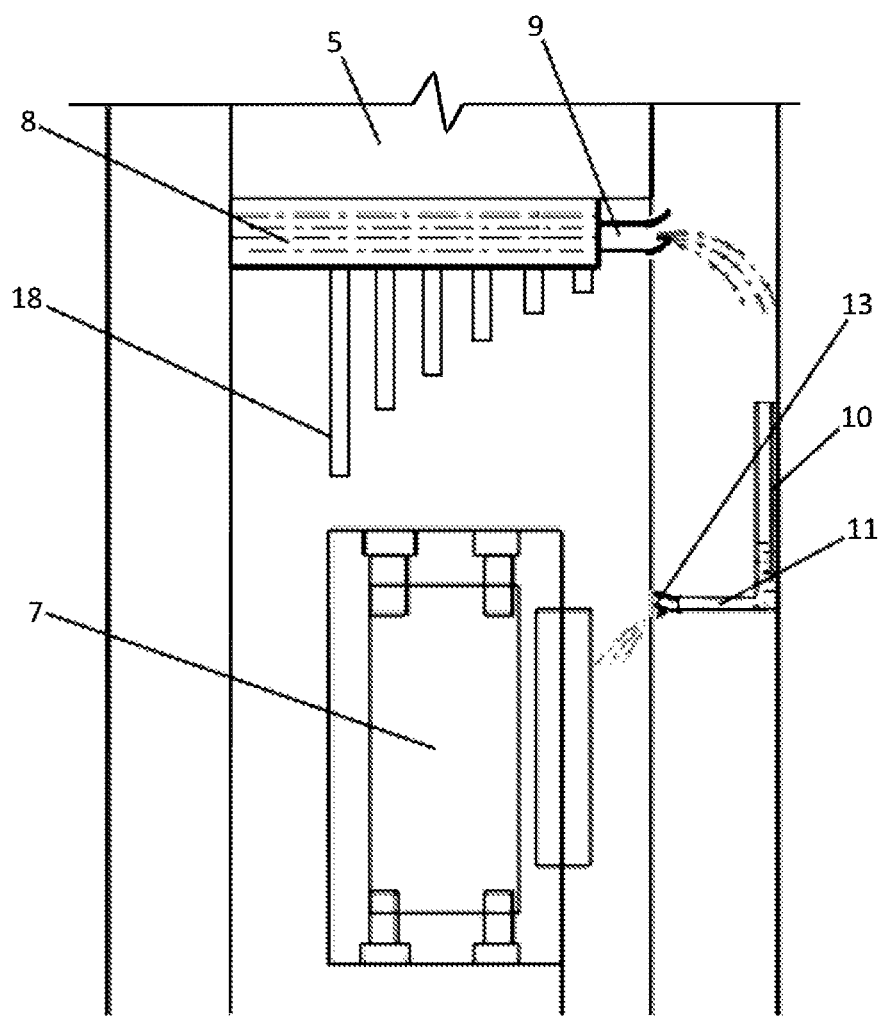
FIG. 2 is a partial and magnified schematic diagram of structures appearing in FIG. 1.
Figure 3:
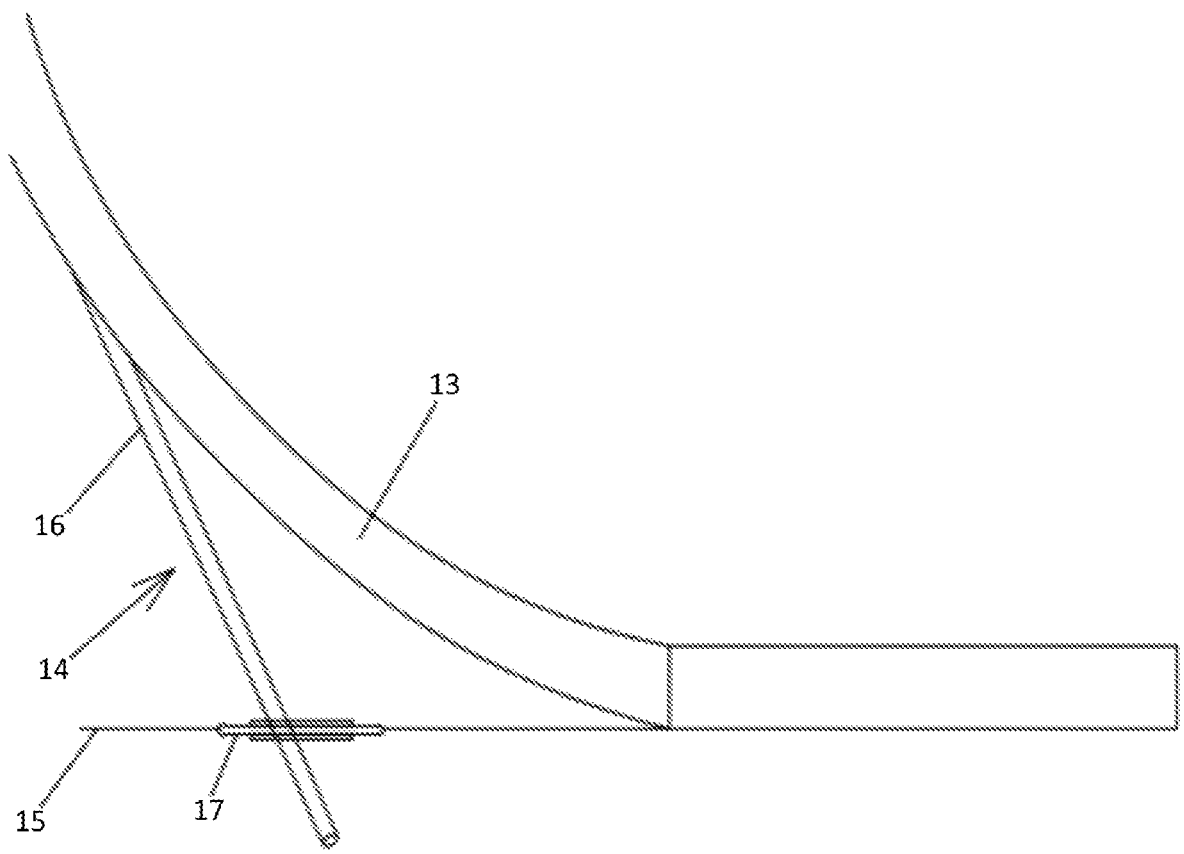
FIG. 3 is a partial and magnified schematic diagram of an adjustable oil spraying assembly within the FIG. 1 structure.

Numeric labels in FIGS. 1-3 are as follows:

1—rack, frame, or casing; 2—drum or roller; 3—belt; 4—sucker rod or polished rod; 5—balance weight or counterweight; 6—guide pulley or roller; 7—reversing block, steering block or roller trolley; 8—oil box or dip buckets; 9—oil injection pipe or forward nozzle; 10—oil collection box or pocket; 11—oil guide pipe or rear nozzle; 12—continuous loop chain; 13—adjustable oil outlet conduit; 14—oil outlet regulating assembly; 15—base plate; 16—adjusting slide rod; 17—through hole; and 18—oil baffle.

DETAILED DESCRIPTION OF EXEMPLARY EMBODIMENTS

As shown in FIGS. 1 and 2, the invention provides a lubrication structure or assembly mounted within the frame or casing of a long stroke vertical column belt type pumping unit, comprising a rack, frame or case (hereinafter referred to as the case) 1 and a drum or roller 2 (hereinafter referred to as the drum) and a belt 3 extending over the drum 2, the belt 3 being guided by the drum 2. The ends of the belt 3 are connected to a sucker rod or polished rod 4 and to a balance weight or counterweight 5 (hereinafter referred to are the counterbalance weight). The counterbalance weight 5 moves freely within the frame or case 1, guided by a plurality of guide rollers 6. A continuous loop chain 12 is connected to the balance weight 5 through a reversing block or roller trolley 7 (hereinafter referred to as the reversing block). The assembly for lubricating the reversing block 7 is operatively mounted between the balance weight 5 and reversing block 7 structure, and the rear wall of the case 1. The lubrication assembly performs oil collecting and filling and oil injection or spraying functions in response to continuous up and down movements of the balance weight 5.

The lubrication assembly includes an oil box or dip buckets 8 (hereinafter referred to as the dip buckets) which are fixedly installed at a position underlying the balance weight 5. The dip buckets 8 are provided with an oil injection pipe or nozzle 9 for spraying lubricating oil rearwardly onto the inner surface of the rear wall of the case 1. The dip bucket 8 is repeatedly immersed below a lubricating oil liquid level within an oil containing well or reservoir situated at the bottom of the case 1, the oil immersion occurring at each arrival of the dip buckets 8 at their lowest points of travel. In the alternative configuration of FIG. 4, such well or reservoir is identified by reference numeral 140.

The lubricating oil which is sprayed onto the inner surface of the rear wall of the case 1 flows freely along such wall under the action of gravity. Such oil temporarily gathers within a collecting box or pocket 10 (hereinafter referred to as a collecting pocket) which is mounted upon the inner surface of the rear wall of the case 1. The oil collecting pocket 10 is provided with an oil guide pipe or nozzle 11 (hereinafter referred to as a guide pipe) for spraying the collected lubricating oil forwardly. The reversing block 7 is thereby lubricated when it moves vertically across the path of such forwardly resprayed oil.

Upwardly angled oil outlet conduits 13 may be mounted at the outlet ends or distal ends of the or nozzle 9 and oil guide pipe. By adding the oil outlet conduits 13, the trajectories of the sprayed oil may be directed upwardly to increase the horizontal travel of the sprayed oil. The oil outlet conduits 13 may be equipped with an angle adjusting assembly 14 which is capable of adjusting the spray angle of the oil. The angle adjusting assembly 14 may include a base plate 15, on which a through hole 17 for installing an adjustment slide rod 16 is set. The other end of the adjustment slide rod 16 is moveably connected with the oil outlet conduits 13, and a limited position element is set at the connection between the adjustment slide rod 16 and the through hole 17. In the depicted embodiment, the angle of the oil outlet pipe is effectively adjusted by changing the extension of the slide rod. The oil guide pipe 11 has shape plasticity in order to cooperate with the adjustment process. The through hole 17 may be an oblong hole to allow a larger range of angle adjustment.

In operation of the instant inventive assembly, the sprayed lubricating oil may be required to traverse an excessive distance between the rearward nozzle and the reversing block 7. To accommodate for such situation, a plurality of sequentially arranged oil baffles 18 may be installed at an elevation which coincides with the path of the forwardly resprayed oil. The lengths of the oil baffles 18 may be gradually shortened from a side of the case 1 close to the oil collecting pocket 10 toward the other side of the case. The oil baffles 18 may be located on both sides of the case 1 and may be bent inwardly to form curved surface structures. As the reversing block Z passes the baffles 18, the reversing block Z may thereby receive more lubricating oil.

In the event that there is insufficient oil spraying static pressure at the lower output of the oil collecting pocket 10, such pocket may be configured as a vertically elongated tube, as depicted in FIG. 2. Such tube functions as a pressure enhancing stand pipe. The ratio of the vertical height of such pressure enhancing tube with respect to the diameter of the oil guide pipe 11 is preferably not less than 10:1. The static pressure is increased by adjusting the effective vertical length of the pressure adjusting tube configuration of the oil collecting pocket 10.

According to the method of instant invention, the dip buckets 8 are installed at a position underlying the balance weight 5 so that the dip buckets 8 move up and down with the balance weight 5. When the balance weight 5 moves to the bottom of the case 1, the dip buckets 8 are immersed in a body of lubricating oil which is stored at the bottom of the case 1, filling the dip buckets 5 with oil. When the balance weight 5 raises, the lubricating oil in the dip bucket 5 is carried upwardly and is sprayed rearwardly toward the inner surface of the rear wall of the case 1 through the dip buckets' oil injection or spraying pipes or nozzles.

Thereafter, the lubricating oil flows downwardly along the rear wall of the case 1 under the action of gravity to enter the oil collecting pocket 10 which is mounted on the rear wall of the case. The lubricating oil collected within the oil collecting pocket 10 is then ejected or sprayed forwardly, the oil emitting from the pocket's upwardly angled oil guide pipe 11.

Thereafter, upon vertical movements of the reversing block 7 across the elevation of the oil collecting pocket 10, the arcuately forwardly traveling lubricating oil emitting therefrom is applied directly onto the reversing block Z or upon the overlying balance weight 5, achieving needed lubrication.

Figure 4:
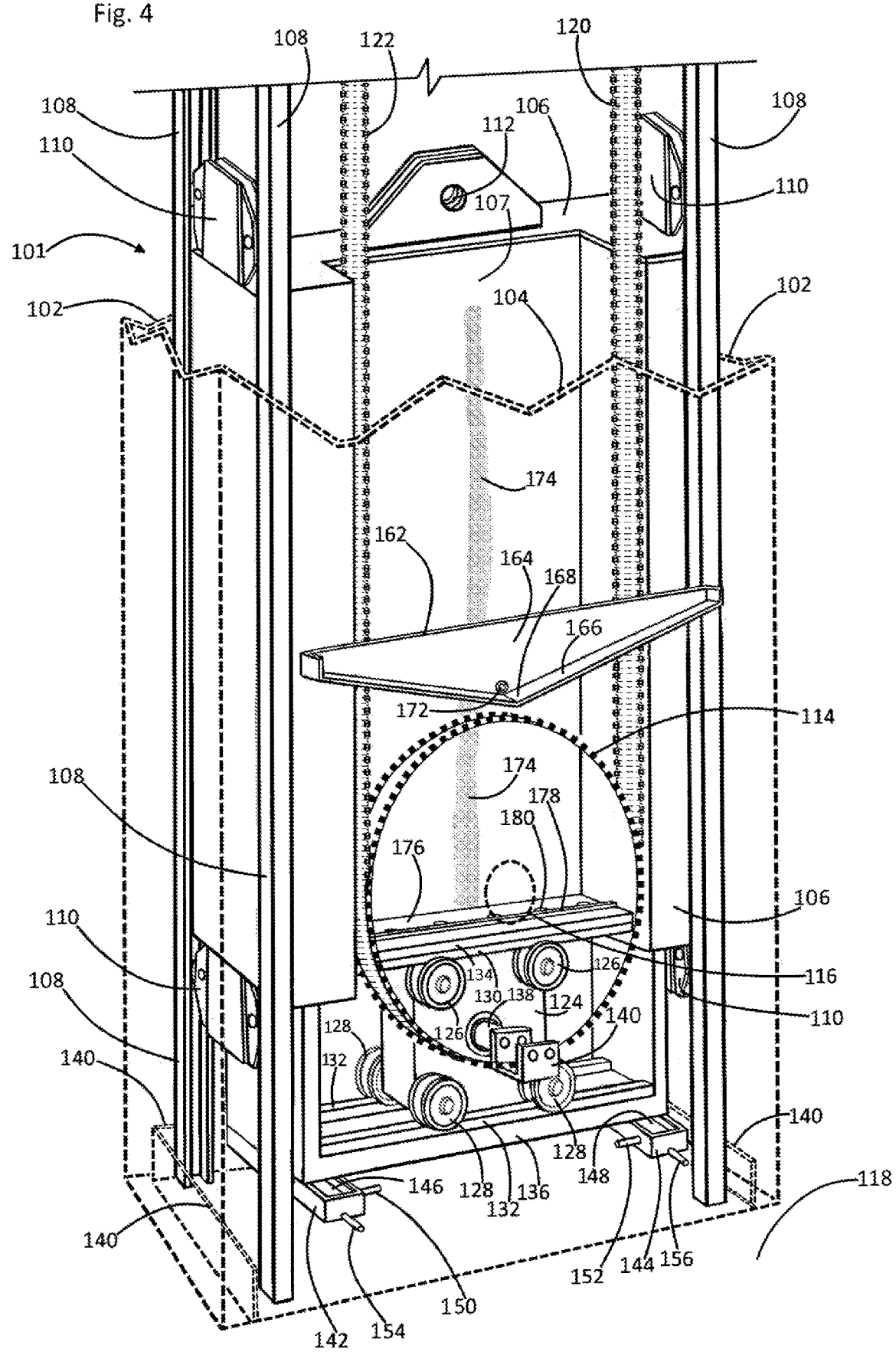
FIG. 4 is a perspective view of an alternative embodiment of the instant invention, the view showing derrick tower casing, lubrication well, and sprocket and chain drive components in broken lines.

Referring to FIGS. 4 and 5, an alternative embodiment of the inventive belt pumping unit lubrication assembly is referred to generally by Reference Numeral 101. The inventive lubricating assembly of FIGS. 4 and 5 embodiment resides within the vertical tower or derrick of a commonly or conventionally configured long stroke oil well rig, such tower or derrick having an outer casing or housing 102 which is designated by broken lines. The casing 102 has a rear wall 104 which functions, as explained below, as an integral oil conveying component of the instant inventive assembly.

A counterweight 106 reciprocatingly moves upwardly and downwardly within the hollow interior of the derrick casing 102, such counterweight being guided by vertically extending roller tracks 108. Rollers 110 which are fixedly mounted to the upper and lower ends of the counterweight 106 are received within and roll along the vertical tracks 108.

Upper roller and belt components of the FIGS. 4 and 5 pumping rig are not shown within the views of FIGS. 4 and 5. In operation, the rearward end of such belt attaches to the counterweight's upper attachment eye 112, and such belt's forward end attaches to a vertically reciprocating wellhead sucker rod or polished rod (also not depicted within views).

A lower drive sprocket 114 is shown in broken lines, such sprocket having a central rotary power input 116 which also is shown in broken lines. A horizontal surface 118 upon which the depicted derrick structure 101 may be mounted commonly comprises a skid, base, or foundation structure (not shown within views), such structure extending rearwardly from the lower end of the derrick tower 102. An electric motor (also not depicted within views) and a gear train assembly (also not depicted within views) is commonly mounted upon such skid or base immediately behind the tower 102, such electric motor and gear train being connected operatively to the drive sprocket's rotary power input 116.

Powered clockwise turning of the drive sprocket 114 may forcefully downwardly draw a rightward flight 120 of a continuous loop chain, such chain engaging the lower aspect of sprocket 114 and continuing upwardly along a leftward flight 122. Such continuous loop chain 120,122 similarly spans over an upper rotatably mounted idler sprocket (not shown within views).

In order to maintain a secure mechanical linkage of the counterweight 106 with the continuous loop chain 120,122 during its cycling motion over and under the idler and drive sprockets, a reciprocatingly movable roller trolley 124 is provided. Through lateral reciprocating motions, such trolley 124 serves as a mechanical linking member which spans between the chain 120,122, and the counterweight 106. Upper and lower rollers 126 and 128 are rotatably mounted to the upper and lower ends of the central block or body of the roller trolley 124, such rollers being guided by and rollably moving leftwardly and rightwardly along upper and lower roller tracks 130 and 132. A roller trolley capturing and supporting frame is fixedly attached to the lower end of the counterweight 106, such frame suitably comprising an upper transverse member 134 and a lower "U" member 136.

A central chain linking journal axle 138 is mounted rotatably upon the trolley's central block, such axle having a chain attachment knuckle 140 fixedly attached to its distal end. The knuckle 140 preferably fixedly anchors the distal end of the journal axle 138 at a specific point or link upon the continuous loop chain 120,122.

In operation of the chain coupling roller trolley 124, powered clockwise rotation of the drive sprocket 114 forcefully downwardly pulls against the rightward flight 120 of the continuous loop chain 120,122, such pulling force simultaneously upwardly drawing chain's leftward flight 122. The resultant upward drawing of the chain's leftward flight 122 pulls the chain knuckle 140 along with axle 138 and the trolley 124 leftwardly and upwardly about the drive sprocket 114, such motion causing the trolley to simultaneously roll leftwardly along tracks 130 and 132 within the track frame 134,136. A simultaneous lifting force is applied to the chain's leftward flight 122 via the rigid linkage of the track frame 134,136, with the lower end of the counterweight 106. Such lifting action continues until the knuckle 140 reaches the upper idler sprocket, there passing over the upper aspect of such sprocket while the roller trolley 124 travels rightwardly within the frame 134,136. Immediately thereafter, all structures mechanically linked to the chain, including the counterweight 106, follow such chain's rightward downward flight 122. During such downward passage, kinetic energy of the counterweight 106 translates to upward oil pumping force via the overlying belt and pulley. As the continuous loop chain 120,22 continuously cycles about the upper and lower sprockets, the roller trolley 124 continuously reciprocatingly shifts leftwardly and rightwardly within frame 134,136 while continuously vertically raising and lowering the counterweight and the wellhead's polished rod.

During the continual mechanical cycling motions described above, frictional wear is known to occur at the toothed engagement of the drive sprocket 114 with the continuous loop chain 120,122. Needed lubrication at the chain and drive sprocket's wear points is known to be provided by installation of a lower or underlying lubricant well 140 beneath the counterweight 106 and beneath the trolley frame 134,136.

A pair of or left and right dip buckets 142 and 144 are known to be provided in conjunction with such well 140. Such dip buckets are attached at the lower end or surface of frame member 136, such buckets being situated at the left and right ends of track frame member 136. Downward motion of the counterweight 106 along roller tracks 108 extends the lower end of the frame member 136 along with the left and right dip buckets 142 and 144 into the oil lubricant which is contained within the well 140, such extension causing the lubricant to fill the dip buckets 142 and 144 via upwardly opening inlet ports 146 and 148.

Upon subsequent upward travel of the counterweight 106, the dip buckets 142 and 144 emerge from the lubricant contained within well 140, and the collected portions of the lubricant immediately begin to emit rightwardly and leftwardly through nozzle adapted outlet ports 150 and 152. Rightward and leftward emissions of lubricating oil from the left and right nozzle ports 150 and 152 respectively travel through the air space rightwardly and leftwardly. Upon continued upward travel of the counter-weight 106, such emitting flows of lubricant intersect and bathe the lower drive sprocket 114 along with chain flights 120 and 122.

The nozzles 150 and 152 which extend laterally from the rearwardly extending ends of the dip buckets 142 and 144 may easily effect gravity flow actuated lubrication of the drive sprocket 114 and the chain 120,122, since the nozzles 150 and 152 travel vertically along and past such structures. In contrast, the roller trolley 124 moves with the underlying nozzles 150 and 152. As a result of such roller trolley positioning, lubricants emitting from nozzles 150 and 152 mounted upon the rearwardly extending dip buckets 142 and 144 will not normally flow toward the overlying roller trolley 124. Notwithstanding, lubrication of the roller trolley's moving, rolling, and rotating parts is needed.

The instant inventive assembly solves such deficit or problem posed by the dip bucket's orientation below the roller trolley by further associating with the left and right dip bucket vessels 142 and 144 at least a first and preferably a pair of rearwardly extending nozzle configured ports 154 and 156. In operation of such additional nozzles, lubricating oil dispensed from the dip buckets 142 and 144 additionally emits and disperses rearwardly from such nozzles' rearwardly distal ends. As the filled dip buckets 142 and 144 rise out of the body of lubricating oil contained within the lubricant well 140, such rearward oil dispersion immediately commences.

Referring simultaneously to FIGS. 4 and 5, during the portions of the vertical travels of the dip buckets 142 and 144 which are above the drive sprocket 114, oil emitting rearwardly from nozzles 154 and 156 traverses the air space between the distal ends of such nozzles and the forwardly facing surface of the case's rear wall 104. Such oil, denoted in FIG. 5 by Reference Numerals 160, adheres to the rear wall 104, and flows downwardly therealong. Accordingly, the instant invention utilizes the forward face of the case's rear wall 104 as a fluid capturing and conveying conduit. A lubrication oil capturing vessel in the form of a collecting pocket 162 is fixedly mounted to the wall 104 in the flow path of the oil 160, such pocket 162 defining an upwardly opening interior space 164. In the preferred embodiment, the pocket 162 utilizes a portion of the forwardly facing surface of the case's rear wall 104 as a pocket completing rear wall.

The pocket 162 preferably has a "V" shaped floor 166 which conducts collected oil centrally, the floor 166 forming a lower vertex 168 which serves as a point of central oil fluid concentration. A rear oil return nozzle 170 extends forwardly from an outlet port 172 at the pocket's vertex 168.

In operation of the instant inventive assembly, portions of the oil supplied by the lower well 140 which are emitted rearwardly from nozzles 154 and 156 temporarily collect upon the forward face of the rearward wall 104, such oil flowing in streams 160 downwardly into the collection pocket 162. Such oil 160 then centrally collects and reverses course, re-emitting forwardly through the forwardly extending rear nozzle 170. The forwardly emitting oil traverses the air space in front of nozzle 170 to contact and collect upon the roller trolley 124 and upon the rearwardly facing surface 107 of the counterweight 106. Accordingly, portions of the oil emitting forwardly from nozzle 170 may directly lubricate the roller trolley 124.

Similarly with the initial downward flows 160 of the oil over the forward face of the rearward wall 104, portions of the rearwardly re-dispersed oil flow downwardly in a stream 174 along the rearwardly facing surface 107 of the counterweight 106. Since the roller trolley 124 underlies the counterweight's rearward surface 107, such downward flow 174 is properly oriented and directed for lubricating the underlying trolley 124 and its rolling and movable parts 126,128,130,132.

In a suitable embodiment, an upwardly opening oil capturing vessel or tray 176 is provided, such tray being rearwardly bounded and defined by a dam or flange 178. The floor of such upwardly opening tray 176 may comprise the upper surface of upper frame member 134. In such embodiment the tray 176 is opened by at least a first, and preferably a plurality of lubricant passage ports 180 whose lower ends communicate with the immediately underlying trolley 124. Oil flowing downwardly from tray 176 through lubricant passage ports 180 advantageously falls directly onto and over the roller trolley 124, effectively lubricating the trolley along with its rolling and moving parts.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A lubrication assembly for a belt pumping unit comprising:
    (a) a frame having a wall, a drum, and a belt, the belt having a first end and a second end, the belt extending over the drum, wherein the first end of the belt is connected to a sucker rod, wherein the second end of the belt is connected to an upper end of a balance weight, wherein the balance weight has a lower end, and wherein the balance weight moves vertically in the frame guided by a plurality of rollers;
    (b) a chain connected to the lower end of the balance weight by a steering block having a lower end; and
    (c) a plurality of vessels and a plurality of nozzles, each nozzle being connected operatively to one of the vessels, at least one vessel among the plurality of vessels being mounted upon the lower end of the steering block, and another vessel among the plurality of vessels being mounted upon the frame's wall, wherein, the balance weight, the steering block, and the at least one steering block mounted vessel move vertically and upon the vertical movements the pluralities of vessels and nozzles perform oil filling and oil spraying, the oil filling and oil spraying being actuated by the vertical movements of the balance weight, the steering block, and the at least one steering block mounted vessel.

2. The lubrication assembly for a belt pumping unit of claim 1 wherein the at least one steering block mounted vessel comprises an oil box mounted below the lower end of the balance weight, wherein the another vessel comprises an oil collecting box, wherein the at least one steering block mounted vessel's nozzle extends from the oil box and is adapted for spraying lubricating oil onto the frame's wall, wherein the lubricating oil sprayed onto the frame's wall flows downwardly along said wall into the oil collecting box, and wherein the another vessel's nozzle extends from the oil collecting box, and wherein the another vessel's nozzle is adapted for spraying the lubricating oil onto the steering block.

3. The lubrication assembly for a belt pumping unit of claim 2 wherein the another vessel's nozzle comprises a flexible oil conduit, and comprising an angle adjusting assembly operatively connected to the flexible oil conduit.

4. The lubrication assembly for a belt pumping unit of claim 3, further comprising a regulating rod, wherein the angle adjusting assembly comprises a bottom plate having a through hole adapted for operatively receiving the regulating rod, wherein the regulating rod is moveably connected to the flexible oil conduit.

5. The lubrication assembly for a belt pumping unit of claim 4, wherein the through hole is oblong.

6. The lubrication assembly for a belt pumping unit of claim 2 comprising a plurality of sequentially set oil baffles which are positioned for receiving oil from the another vessel's nozzle.

7. The lubricating assembly for a belt pumping unit of claim 2 wherein the oil collecting box comprises a vertically elongated fluid pressure increasing portion, and wherein the vertically elongated fluid pressure increasing portion communicates with the another vessel's nozzle.

8. A method for lubricating a belt pumping unit steering block comprising steps of:
(a) installing below a balance weight an oil box that moves up and down with the balance weight;
(b) immersing the oil box within oil upon downward movements of the balance weight;
(c) spraying the oil from the oil box toward a frame wall upon upward movements of the balance weight and the oil box;
(d) collecting downward flows of the oil within an oil collecting box mounted upon said frame wall; and
(e) respraying the oil from the oil collecting box toward the steering block.

9. An assembly for dispersing a lubricant within a case of a long stroke oil well rig, wherein the case has a wall, wherein the case houses a vertically moving counterweight, wherein the case further houses a continuous loop chain drive having a pair of vertically extending chain flights, wherein the case further houses a roller trolley, wherein the counterweight has a side wall, and wherein the roller trolley interconnects the vertically moving counterweight and the continuous loop chain drive, said assembly comprising:
(a) a track frame having an upper end and a lower end, the track frame receiving the roller trolley, the track frame facilitating horizontal rolling motions of the roller trolley;
(b) at least a first dip bucket fixedly attached to the lower end of the track frame;
(c) a first nozzle connected operatively to the at least first dip bucket, the first nozzle being adapted for dispersing portions of the lubricant toward the case's wall;
(d) a lubricant well within the case, the lubricant well being positioned for receiving and filling the at least first dip bucket;
(e) a collection pocket mounted upon the wall, the collection pocket being positioned for receiving the portions of the lubricant dispersed toward the wall; and
(f) a second nozzle connected operatively to the collection pocket, the second nozzle being adapted for dispersing portions of the lubricant toward the roller trolley.

10. The assembly of claim 9 wherein the second nozzle is further adapted for dispersing portions of the lubricant toward the counterweight's side wall.

11. The assembly of claim 10 further comprising a second dip bucket, the second dip bucket being separate from the first dip bucket, the second dip bucket being fixedly attached to the lower end of the track frame, the first dip bucket and the second dip bucket being spaced a horizontal distance away from each other.

12. The assembly of claim 11 further comprising a catch tray having a floor, the catch tray being mounted at the upper end of the track frame, and further comprising at least a first lubricant passage port that is opened at the catch tray's floor.

13. The assembly of claim 12 wherein the track frame has an upper transverse member, and wherein the catch tray's floor comprises said upper transverse member.

14. The assembly of claim 11 further comprising a third nozzle connected operatively to one of the dip buckets among, the first and the second dip buckets the first and the second dip buckets.

15. The assembly of claim 14 wherein the collection pocket has a horizontal dimension, wherein the collection pocket's horizontal dimension is greater than the horizontal distance between the at least first dip bucket and the second dip bucket.

16. The assembly of claim 15 wherein the collection pocket has a "V" floor having a vertex, wherein the second nozzle extends from said vertex.

17. The assembly of claim 16 wherein the second nozzle is positioned upon the collection pocket for dispersing the lubricant between the chain's pair of vertically extending chain flights.

* * * * *